(12) United States Patent
Slegelis et al.

(10) Patent No.: US 11,267,443 B2
(45) Date of Patent: *Mar. 8, 2022

(54) MACHINE SUSPENSION SYSTEM

(71) Applicant: BRIGGS & STRATTON, LLC, Wauwatosa, WI (US)

(72) Inventors: Erik R. Slegelis, Port Washington, WI (US); Travis Rasch, Hutisford, WI (US)

(73) Assignee: Briggs & Stratton, LLC, Wauwatosa, WI (US)

(*) Notice: Subject to any disclaimer, the term of this patent is extended or adjusted under 35 U.S.C. 154(b) by 47 days.

This patent is subject to a terminal disclaimer.

(21) Appl. No.: 16/596,207

(22) Filed: Oct. 8, 2019

(65) Prior Publication Data

US 2020/0180573 A1 Jun. 11, 2020

Related U.S. Application Data

(63) Continuation of application No. 16/018,020, filed on Jun. 25, 2018, now Pat. No. 10,464,537, which is a
(Continued)

(51) Int. Cl.
*B60T 7/10* (2006.01)
*F02B 61/00* (2006.01)
(Continued)

(52) U.S. Cl.
CPC .............. *B60T 7/10* (2013.01); *A01D 34/64* (2013.01); *B60T 1/062* (2013.01); *B60T 7/102* (2013.01);
(Continued)

(58) Field of Classification Search
CPC ......... B62D 11/06; F02B 61/00; A01D 34/64; A01D 2101/00; B60T 1/062; B60T 7/10
(Continued)

(56) References Cited

U.S. PATENT DOCUMENTS

| 2,756,045 A | 7/1956 | Savory |
| 3,311,186 A | 3/1967 | Kamlukin |

(Continued)

FOREIGN PATENT DOCUMENTS

| DE | 38 04 423 | 8/1988 |
| JP | 2004-055918 | 2/2004 |

OTHER PUBLICATIONS

Complaint filed on Mar. 20, 2013 in *Briggs&Stratton Corporation, Briggs &Stratton Power Products Group, LLC* v. Chongqing RATO Power Co., Ltd; RATO North America; Denver Global Products, Inc., 5:13-CV-0316 (TJM/ATB), United States District Court, Northern District of New York.

(Continued)

*Primary Examiner* — Toan C To
(74) *Attorney, Agent, or Firm* — Foley & Lardner LLP

(57) ABSTRACT

A machine includes a prime mover having a power take-off, a chassis configured to support at least an operator and the prime mover, a subframe pivotally coupled to the chassis about a pivot axis at a first location, at least one drive device configured to drive wheels of the machine, a drive belt and pulley arrangement. The subframe is further coupled to the chassis via at least one suspension device at a second location. The at least one drive device is driven by the prime mover and is coupled to the subframe. The pulley arrangement is configured to direct the drive belt from the power take-off of the prime mover to at least one drive pulley on the at least one drive device. The pulley arrangement comprises an idler pulley having a diameter and a rotational axis. The idler pulley is coupled to the chassis such that the rotational axis is spaced from the pivot axis by no greater than 1.5 times the diameter.

19 Claims, 13 Drawing Sheets

Related U.S. Application Data continuation of application No. 15/150,485, filed on May 10, 2016, now Pat. No. 10,005,437.

(60) Provisional application No. 62/131,738, filed on Mar. 11, 2015.

(51) Int. Cl.

| | | |
|---|---|---|
| *A01D 34/64* | (2006.01) | |
| *B60T 1/06* | (2006.01) | |
| *B60T 11/04* | (2006.01) | |
| *F02B 75/00* | (2006.01) | |
| *A01D 101/00* | (2006.01) | |
| *F16D 125/60* | (2012.01) | |

(52) U.S. Cl.
CPC ............ *B60T 11/046* (2013.01); *F02B 61/00* (2013.01); *F02B 75/007* (2013.01); *A01D 2101/00* (2013.01); *F16D 2125/60* (2013.01)

(58) Field of Classification Search
USPC ............................................. 180/53.6, 53.61
See application file for complete search history.

(56) References Cited

U.S. PATENT DOCUMENTS

| | | | |
|---|---|---|---|
| 3,719,371 A | 3/1973 | Musgrave | |
| 3,796,275 A | 3/1974 | Bouyer | |
| 3,876,226 A | 4/1975 | Cutler | |
| 3,940,161 A | 2/1976 | Allison | |
| 3,954,255 A | 5/1976 | Keijzer et al. | |
| 4,037,389 A | 7/1977 | Harkness | |
| 4,042,053 A | 8/1977 | Sieren et al. | |
| 4,102,114 A * | 7/1978 | Estes ................... | A01D 34/662 56/15.2 |
| 4,132,121 A | 1/1979 | Clarke | |
| 4,231,215 A * | 11/1980 | Kias ....................... | A01D 34/30 56/11.6 |
| 4,256,292 A | 3/1981 | Sullivan et al. | |
| 4,367,864 A | 1/1983 | Eldeen | |
| 4,449,602 A | 5/1984 | Dittmann, Jr. | |
| 4,553,381 A | 11/1985 | Sonnenberg | |
| 4,577,712 A | 3/1986 | Foote et al. | |
| 4,592,439 A | 6/1986 | Collard et al. | |
| 4,809,796 A | 3/1989 | Yamaoka et al. | |
| 4,860,850 A | 8/1989 | Takahashi | |
| 4,969,533 A | 11/1990 | Holm et al. | |
| 5,012,632 A * | 5/1991 | Kuhn ..................... | A01D 34/76 474/135 |
| 5,042,238 A | 8/1991 | White et al. | |
| 5,067,933 A | 11/1991 | Hardesty et al. | |
| 5,090,512 A | 2/1992 | Mullet et al. | |
| 5,343,974 A | 9/1994 | Rabek | |
| 5,353,580 A | 10/1994 | Wolff | |
| 5,367,861 A | 11/1994 | Murakawa et al. | |
| 5,367,864 A | 11/1994 | Ogasawara et al. | |
| 5,381,647 A | 1/1995 | Eberle | |
| 5,433,066 A | 7/1995 | Wenzel et al. | |
| 5,483,787 A * | 1/1996 | Berrios ................. | A01D 34/661 56/10.1 |
| 5,487,535 A | 1/1996 | Carter et al. | |
| 5,706,907 A | 1/1998 | Unruh | |
| 5,799,475 A | 9/1998 | Borling et al. | |
| 5,873,224 A | 2/1999 | Murakawa et al. | |
| 5,946,893 A | 9/1999 | Gordon | |
| 5,996,982 A | 12/1999 | Bell | |
| 6,062,333 A | 5/2000 | Gordon | |
| 6,098,740 A | 8/2000 | Abend et al. | |
| 6,101,794 A | 8/2000 | Christopherson et al. | |
| 6,170,242 B1 | 1/2001 | Gordon | |
| 6,178,668 B1 | 1/2001 | Gustafson et al. | |
| 6,244,025 B1 | 6/2001 | Ferris et al. | |
| 6,425,452 B1 | 7/2002 | Steiner et al. | |
| 6,460,318 B1 | 10/2002 | Ferris et al. | |
| 6,501,678 B1 | 12/2002 | Lenssen et al. | |
| 6,510,678 B2 | 1/2003 | Ferris et al. | |
| 6,711,885 B2 | 3/2004 | Ferris | |
| 6,830,115 B2 | 12/2004 | Okada et al. | |
| 6,857,254 B2 | 2/2005 | Melone et al. | |
| 6,874,593 B2 | 4/2005 | Abend et al. | |
| 6,902,017 B2 | 6/2005 | Ohashi | |
| 6,904,985 B2 | 6/2005 | Ferree et al. | |
| 7,078,292 B2 | 7/2006 | Park et al. | |
| 7,082,759 B1 | 8/2006 | Tsukamoto et al. | |
| 7,107,746 B2 | 9/2006 | Melone et al. | |
| 7,373,871 B1 | 5/2008 | Buescher | |
| 7,374,187 B2 | 5/2008 | Melone et al. | |
| 7,427,247 B2 | 9/2008 | Melone | |
| 7,475,894 B2 | 1/2009 | Hodge | |
| 7,494,142 B2 | 2/2009 | Wolter | |
| 7,503,161 B1 | 3/2009 | Mizukawa et al. | |
| 7,600,769 B2 | 10/2009 | Bessho et al. | |
| 7,694,769 B2 | 4/2010 | McGuire | |
| 7,708,106 B1 | 5/2010 | Bergman et al. | |
| 7,775,314 B2 | 8/2010 | Blais et al. | |
| 7,793,745 B2 | 9/2010 | Witt et al. | |
| 7,896,123 B2 | 3/2011 | Ohashi et al. | |
| 7,900,943 B2 | 3/2011 | Stewart | |
| 7,930,813 B2 | 4/2011 | Melone et al. | |
| 7,934,579 B2 | 5/2011 | Bowers | |
| 8,322,736 B2 | 12/2012 | Bowers | |
| 8,397,367 B2 | 3/2013 | Melone et al. | |
| 8,398,101 B2 | 3/2013 | Alexander et al. | |
| 8,517,140 B2 | 8/2013 | West et al. | |
| 9,161,490 B2 | 10/2015 | Melone et al. | |
| 9,481,242 B2 | 11/2016 | Melone et al. | |
| 9,597,957 B2 | 3/2017 | Weber et al. | |
| 9,707,842 B2 | 7/2017 | Melone et al. | |
| 9,849,776 B2 | 12/2017 | Melone et al. | |
| 10,005,437 B2 | 6/2018 | Slegelis et al. | |
| 10,093,178 B2 | 10/2018 | Melone et al. | |
| 10,093,179 B2 | 10/2018 | Melone et al. | |
| 10,421,356 B2 | 9/2019 | Weber et al. | |
| 10,464,537 B2 | 11/2019 | Slegelis et al. | |
| 10,882,397 B2 | 1/2021 | Melone et al. | |
| 2002/0043422 A1 | 4/2002 | Suzuki | |
| 2002/0083694 A1* | 7/2002 | Nagai ................ | A01D 43/0635 56/16.8 |
| 2002/0179341 A1 | 12/2002 | Boyer et al. | |
| 2003/0000191 A1 | 1/2003 | Papke | |
| 2003/0127266 A1 | 7/2003 | Kirkpatrick | |
| 2003/0179341 A1 | 9/2003 | Choo | |
| 2003/0213625 A1* | 11/2003 | Okada .................. | B62D 11/105 180/6.2 |
| 2004/0079063 A1 | 4/2004 | Ishimori | |
| 2004/0182057 A1* | 9/2004 | Price .................... | A01D 34/661 56/14.7 |
| 2007/0209457 A1 | 9/2007 | Irikura et al. | |
| 2007/0283675 A1 | 12/2007 | Hancock et al. | |
| 2008/0302075 A1* | 12/2008 | Eavenson, Sr. ........ | A01D 34/76 56/11.6 |
| 2009/0127813 A1 | 5/2009 | Stewart | |
| 2009/0218731 A1 | 9/2009 | Sellars et al. | |
| 2009/0241702 A1* | 10/2009 | Osuga .................. | B60K 17/105 74/11 |
| 2011/0197419 A1 | 8/2011 | Melone et al. | |
| 2012/0248726 A1 | 10/2012 | Batdorf et al. | |
| 2013/0047567 A1* | 2/2013 | Minoura ................ | A01D 69/06 56/14.7 |
| 2013/0291508 A1 | 11/2013 | Melone et al. | |
| 2015/0040531 A1 | 2/2015 | Melone et al. | |
| 2015/0078871 A1 | 3/2015 | Eavenson et al. | |
| 2017/0028844 A1 | 2/2017 | Melone et al. | |
| 2019/0184822 A1 | 6/2019 | Vigen et al. | |
| 2020/0156467 A1 | 5/2020 | Weber et al. | |
| 2020/0180573 A1 | 6/2020 | Slegelis et al. | |
| 2021/0122237 A1 | 4/2021 | Melone et al. | |

OTHER PUBLICATIONS

Declaration of Clark J. Radcliffe in Support of Defendants' Motions for Summary Judgment filed on Jan. 7, 2014 in *Briggs&Stratton*

(56) References Cited

OTHER PUBLICATIONS

*Corporation, Briggs&Stratton Power Products Group, LLC* v. *Chongqing RATO Power Co., Ltd;*RATO North America; Denver Global Products, Inc., 5:13-CV-0316 (LEK/ATB), United States District Court, Northern District of New York, 95 pages.

Declaration of Jeffrey M. Olson in Support of Defendants' Motions for Summary Judgment of Invalidity filed on Jan. 7, 2014 in *Briggs&Stratton Corporation, Briggs &Stratton Power Products Group, LLC* v. *Chongqing RATO Power Ltd; RATO North America;* Denver Global Products, Inc., 5:13-CV-0316 (LEK/ATB), United States District Court, Northern District of New York, 306 pages.

Declaration of Jeffrey M. Olson in Support of Defendants' Opening Claim Construction Brief and Motion for Summary Judgment of Indefiniteness filed on Jan. 30, 2014 in *Briggs&Stratton Corporation, Briggs & Stratton Power Products Group, LLC* v. *Chongqing RATO Power Co., Ltd;*RATO North America; Denver Global Products, Inc., 5:13- SV-0316 (LEK/ATB), United States District Court, Northern District of New York, 212 pages.

U.S. Appl. No. 61/643,809, filed May 7, 2012, Slegelis et al.

U.S. Appl. No. 61/677,288, filed Jul. 30, 2012, Melone et al.

U.S. Appl. No. 62/131,738, filed Mar. 11, 2015, Slegelis et al.

Defendants' [Proposed] Amended L. Pal. R. 3.3-3.4 Disclosure or Non-inrrnngement and Invalidity Contentions mailed on Nov. 1, 2013 in *Briggs&Stratton Corporation, Briggs & Stratton Power Products Group, LLC* v. *Chongqing RATO Power Co., Ltd; RATO North America; Denver Global Products, Inc.,*5:13-CV-0316 {LEK/ATB), United States District Court, Northern District of New York, 86 pages.

Defendants' Amended L. Pal. R. 3.3-3.4 Disclosure of Non-Infringement and Invalidity Contentions mailed on Dec. 16, 2013 in *Briggs&Stratton Corporation, Briggs &Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 87 pages.

Defendants' Corrected Answer to Complaint and Defendant Denver Global Products, Inc.'s Counterclaims and Demand for Jury Trial filed on Jun. 12, 2013 in *Briggs&Stratton Corporation, Briggs &Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 15 pages.

Defendants' L. Pal. R. 3.3-3.4 Disclosure of Non-Infringement and Invalidity Contentions mailed on Oct. 21, 2013 on *Briggs&Stratton Corporation, Briggs & Stratton Power Products Group, LLC* v. *Chongqing RATO Power Co., Ltd.; RATO North America; Denver Global Products, Inc.,*5:13-CV-0316 (LEK/ATB), United States District Court, Northern District of New York, 78 pages.

Defendants' Opening Claim Construction Brief filed on Jan. 30, 2014 in *Briggs&Stratton Corporation, Briggs& Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 30 pages.

Defendants' Preliminary Proposed Constructions and Preliminary Identification of Intrinsic and Extrinsic Evidence mailed on Nov. 27, 2013 in *Briggs&Stratton Corporation, Briggs& Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 40 pages.

Defendants' Responsive Claim Construction Brief filed on Mar. 3, 2014 in *Briggs&Stratton Corporation, Briggs& Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 29 pages.

Expert Declaration of Clark J. Radcliffe regarding Claim Term Definitions for Construction filed on Jan. 30, 2014 in *Briggs &Stratton Corporation, Briggs& Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 38 pages.

Expert Declaration of Timothy M. Hicks in Response to Defendants' Expert Declaration by Clark J. Radcliffe, PhD mailed on Dec. 23, 2013 in *Briggs & Stratton Corporation, Briggs & Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 9 pages.

Expert Declaration of Timothy M. Hicks Regarding U.S. Pat. No. 7,107,746 filed on Feb. 18, 2014 in *Briggs&Stratton Corporation, Briggs & Stratton Power Products Group, LLC* v. *Chongqing RATO Power Co., Ltd; RATO North America; DenverGlobal Products, Inc.,*5:13-CV-0316 (LEK/ATB), United States District Court, Northern District of New York, 3 pages.

Joint Statement Pursuant to Local Patent Rule 4.7 filed on Mar. 17, 2014 in *Briggs&Stratton Corporation, Briggs & Stratton Power Products Group, LLC* v. *Chongqing RATO Power Co., Ltd.; RATO North America; DenverGlobal Products, Inc.,*5:13-CV-0316 (LEK/ATB), United States District Court, Northern District of New York, 5 pages.

Letter Brief to Court regarding significant recent autnonty relating to Denver Global Products, Inc.'s pending Motion for Summary Judgement of Invalidity for Indefiniteness filed on Jun. 3, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 20 pages.

Letter Brief to Court regarding significant recent authority relating to the parties' claim construction briefing and Denver Global Products, Inc.'s pending Motion for Summary Judgement of Invalidity for Indefiniteness filed on Sep. 15, 2014 in *Briggs&Stratton Corporation, Briggs&Stratton Power Products Group, LLC* v. *Chongqing RATO Power Co., ID; RATO North America; Denver Global Products, Inc.,*5:13-CV-0316 (LEK/ATB), United States District Court, Northern District of New York, 17 pages.

Letter to Court addressing statements in Brigg's letter request filed on Feb. 21, 2014 in *Briggs&Stratton Corporation, Briggs&Stratton Power Products Group, LLC* v. *Chongqing RATO Power Co., Ltd; RATO North America Denver Global Products, Inc.,*5:13-CV-0316 (LEK/ATB), United States District Court, Northern District of New York, 2 pages.

Memorandum of Law in Support of Defendants' Notice of Motion for Summary Judgment of Invalidity for Indefiniteness filed on Jan. 30, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 10 pages.

Memorandum-Decision and Order filed on Jul. 30, 2015 in *Briggs &Stratton Corporation, Briggs&Stratton Power Products Group, LLC* v. *Chongqing RATO Power Co., Ltd; RATO North America; Denver Global Products, Inc.,*5:13-3V-0316 (LEK/ATB), United States District Court, Northern District of New York, 18 pages.

Memorandum-Decision and Order filed on Sep. 30, 2014 in *Briggs &Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 40 pages.

Plaintiffs' Disclosure of Asserted Claims and Infringement Contentions Pursuant to Local Patent Rules 3.1 and 3.2 mailed on Sep. 19, 2013 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 28 pages.

Plaintiffs' Opening Claim Construction Brief filed on Jan. 30, 2014 in *Briggs&Stratton Corporation, Briggs&Stratton Power Products Group, LLC* v. *Chongqing RATO Power Co., Ltd; RATO North*

(56) References Cited

OTHER PUBLICATIONS

*America; Denver Global Products, Inc.,*5:13-CV-0316 (LEK/ATB), United States District Court, Northern District of New York, 32 pages.
Plaintiffs' Opposition to Defendants' Motion for Summary Judgement of Invalidity for Indefiniteness filed on Feb. 18, 2014 in *Briggs&Stratton Corporation, Briggs&Stratton Power Products Group, LLC* v. *Chongqing RATO Power So., Ltd; RATO North America; Denver Global Products, Inc.,*5:13-CV-0316 (LEK/ATB), United States District Court, Northern District of New York, 33 pages.
Plaintiffs' Opposition to Defendants' Motion for Summary Judgment of Invalidity of U.S. Pat. No. 6,510,678 filed on Jan. 30, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 31 pages.
Plaintiffs' Opposition to Defendants' Motion for Summary Judgment of Invalidity of U.S. Pat. No. 7,107,746 filed on Jan. 30, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 32 pages.
Plaintiffs' Proposed Constructions and Identification of Intrinsic and Extrinsic Evidence mailed on Nov. 27, 2013 in *Briggs&Stratton Corporation, Briggs&Stratton Power Products Group, LLC* v. *Chongqing RATO Power Co., Ltd.; RATO North America; Denver Global Products, Inc.,*5:13-CV-0316 (LEK/ATB), United States District Court, Northern District of New York, 78 pages.
Plaintiffs' Rebuttal Claim Construction Brief filed on Mar. 3, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 33 pages.
Plaintiffs' Responses and Objections to Rata's First Set of Interrogatories [Nos. 1-10] mailed Oct. 9, 2013 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 61 pages.
Plaintiffs' Responses and Objections to Rata's Second Set of Interrogatories [No. 11] mailed on Jan. 15, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 6 pages.
Plaintiffs-Counterdefendants' Answer to Corrected Counterclaims filed on Jul. 5, 2013 in *Briggs&Stratton Corporation, Briggs &Stratton Power Products Group, LLC* v. *Chongqing RATO Power Co., Ltd; RATO North America Denver Global Products, Inc.,*5:13-CV-0316 (LEK/ATB), United States District Court, Northern District of New York, 9 pages.
Replacement Exhibit 11 to Olson Declaration filed on Jan. 8, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 3 pages.
Reply Brief in Support of Defendants' Motion for Summary Judgment of Invalidity for Indefiniteness filed on February J4, 2014 in *Briggs&Stratton Corporation, Briggs&Stratton Power Products Group, LLC* v. *Chongqing RATO Power So., Ltd.; RATO North America; Denver Global Products, Inc.,*5:13-CV-0316 (LEK/ATB), United States District Court, Northern District of New York, 15 pages.
Reply Brief in Support of Defendants' Motion for Summary Judgment of Invalidity of U.S. Pat. No. 6,510,678 filed on Feb. 10, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 14 pages.
Reply Brief in Support of Defendants' Motion for Summary Judgment of Invalidity of U.S. Pat. No. 7,107,746 filed on Feb. 10, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 14 pages.
Supplemental Declaration of Jeffrey M. Olson in Support of Defendants' Motion for Summary Judgment of Invalidity filed on Feb. 10, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 6 pages.
The Parties' Joint Claim Construction Statement Pursuant to Local Patent Rule 4.4 filed on Dec. 16, 2013 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 9 pages.
Memorandum of Law in Support of Defendants' Motion for Summary Judgment of Invalidity of U.S. Pat. No. 5,510,678 filed on Jan. 7, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 27 pages.
Memorandum of Law in Support of Defendants' Motion for Summary Judgment of Invalidity of U.S. Pat. No. 7,107,746 filed on Jan. 7, 2014 in *Briggs&Stratton Corporation, Briggs&Stratton Power Products Group, LLC* v. *Chongqing RATO Power Co., Ltd; RATO North America; Denver Global Products, Inc.,*5:13-CV-0316 (LEK/ATB), United States District Court, Northern District of New York, 19 pages.
Plaintiffs' Opposition to Defendants' Motion for Summary Judgement for Invalidity for Indefiniteness filed on Feb. 18, 2014 in *Briggs&Stratton Corporation, Briggs&Stratton Power Products Group, LLC* v. *Chongqing RATO Power So., Ltd; RATO North America; Denver Global Products, Inc.,*5:13-CV-0316 (LEK/ATB), United States District Court, Northern District of New York, 33 pages.

* cited by examiner

MACHINE SUSPENSION SYSTEM

CROSS-REFERENCE TO RELATED PATENT APPLICATIONS

This application is a continuation of U.S. patent application Ser. No. 16/018,020, filed Jun. 15, 2018, which is a continuation of U.S. patent application Ser. No. 15/150,485, filed May 10, 2016, now U.S. Pat. No. 10,005,437, which claims the benefit of and priority to U.S. Provisional Patent Application No. 62/131,738, filed Mar. 11, 2015, the entire contents of each of which are incorporated herein by reference.

BACKGROUND

The present invention relates to a suspension system used on machines such as lawn and garden equipment, such as zero-turn radius (ZTR) mowers. Typically, ZTR mowers comprise unsuspended right and left drive wheels operably coupled to a mower frame, with at least one front caster wheel also coupled to the mower frame. However, independently-suspended right and left drive wheels for ZTR mowers have been shown in U.S. Pat. Nos. 5,946,893, 6,062,333, 6,170,242, 6,244,025, 6,460,318, 6,510,678, 6,857,254, and 7,107,746, each of which is incorporated herein by reference. These patents show several variations of independently-suspended right and left drive wheels for ZTR mowers, each embodiment including a prime mover such as an internal combustion engine, a hydraulic pump for each respective drive wheel being operably coupled to the internal combustion engine, and a hydraulic motor for each respective drive wheel being operably coupled to the respective hydraulic pumps. Both the internal combustion engine and the respective hydraulic pumps are connected to the frame of the ZTR mower in an unsuspended manner, wherein the hydraulic pumps are mechanically coupled and driven by the internal combustion engine via, for example, a belt-and-pulley system. The hydraulic pumps are then coupled to the respective hydraulic wheel motors via a series of hoses, wherein the hydraulic wheel motors are mounted on a suspension platform to allow for independent suspension of each of the drive wheels. The delivery of hydraulic fluid from the hydraulic pumps to the hydraulic wheel motors enables zero-turn radius drive capabilities, as is known in the art.

Recently, the use of hydrostatic transmissions known as hydrostatic transaxles has become prevalent in the ZTR mower industry. Hydrostatic transaxles combine the hydraulic pump and hydraulic wheel motor into a single unit, thereby simplifying and reducing the overall cost of the drive system of ZTR mowers and other hydraulically-driven devices. Typically, two hydrostatic transaxles are used, one for each drive wheel of the ZTR mower. Similar to the system described above, the hydraulic pump of the hydraulic transaxle is mechanically driven by an internal combustion engine (or similar drive unit) via a belt-and-pulley system, and the hydraulic pump in turn drives the hydraulic motor for each drive wheel. However, due to the integration of the hydraulic pump and hydraulic wheel motor into a single unit, suspension of the drive wheels on a ZTR mower utilizing hydrostatic transaxles presents several challenges. Foremost of those challenges is the variation in belt angle between the drive pulley coupled to the output shaft of the internal combustion engine and the driven pulley(s) of the hydraulic pump on the hydrostatic transaxle. If the belt angle between the drive and driven pulley(s) is too great, the belt may run off of one or more the pulleys and render the drive system inoperable. These challenges were addressed in the ZTR mower suspension system shown in commonly-owned U.S. Pub. 2013/0291508, incorporated herein by reference. However, the system shown in that publication was directed to a larger, commercial-style ZTR mower, wherein the engine (and thus power take-off) positioning was significantly behind the hydrostatic transaxles, thereby enabling the system's pulleys to be located on a suspended subframe without significant variations in belt angle that would potentially cause the belt to "jump" or run off of one or more pulleys. The component-placement advantages of this larger machine would not necessarily be present in a smaller ZTR mower.

DETAILED DESCRIPTION OF EXAMPLES

Figure 1:
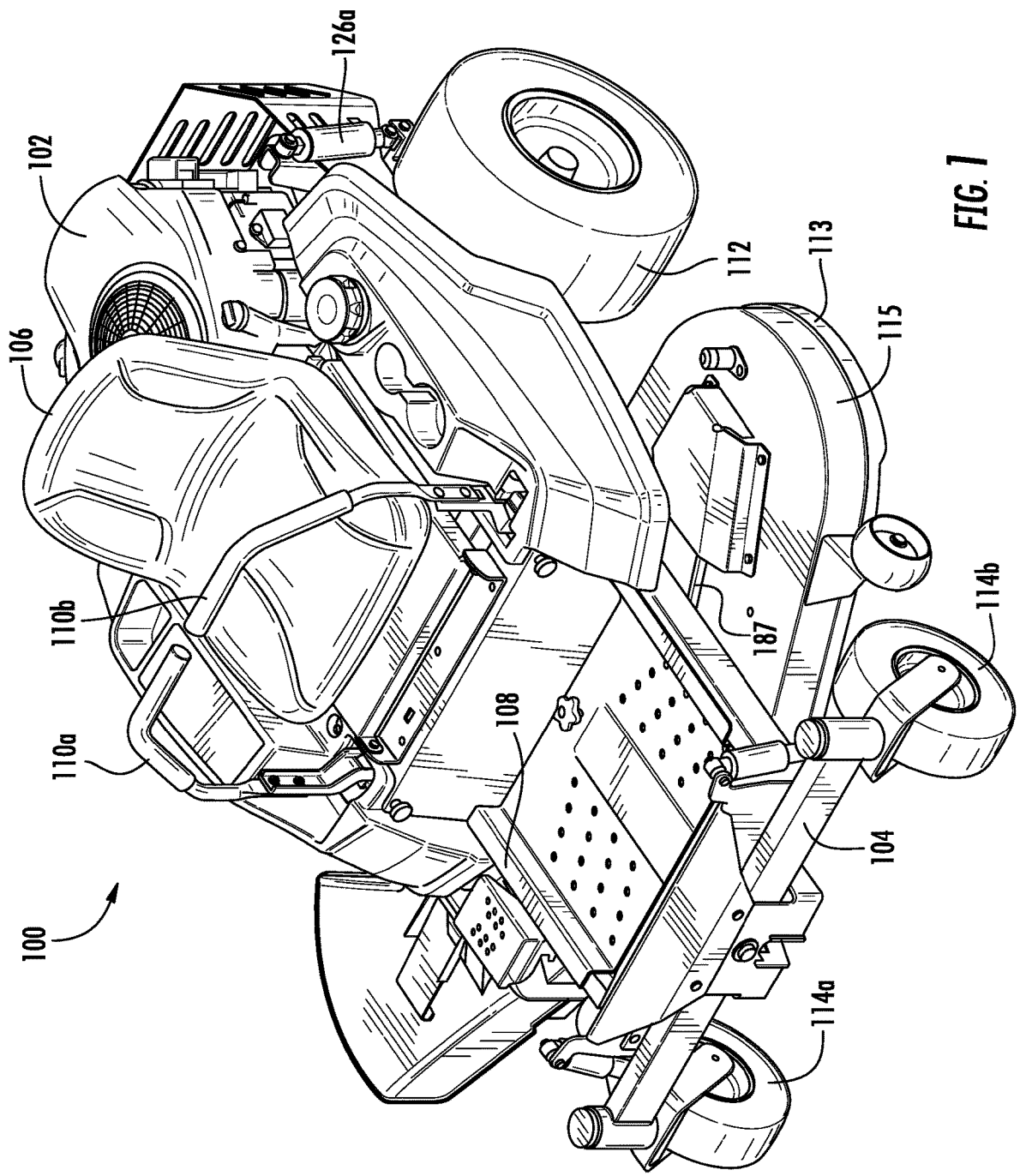
FIG. 1 is an isometric view of an example machine having an example suspension system.

FIG. 1 illustrates of an example machine, an example piece of lawn and garden equipment, shown as a zero turn radius (ZTR) lawnmower 100. ZTR mower 100 of FIG. 1 comprises a prime mover 102, such as an air-cooled internal combustion engine, electric motor, etc., wherein prime mover 102 is supported on a chassis 104. An operator seat 106 is coupled to chassis 104 forward of prime mover 102, enabling an operator to control ZTR lawnmower 100 while seated in seat 106 and having their feet placed on footplate 108. Two control levers 110a, 110b are configured to be pivotally actuated by the operator to enable forward movement, reverse movement, and turning of ZTR lawnmower 100, as is well known in the art.

Control levers 110a, 110b are coupled to respective hydrostatic transaxles (not shown) to power respective right and left drive wheels 112. In lieu of hydrostatic transaxles, drive via independent pump and wheel motors or independent electric drive motors is also possible. Additionally, it is possible for a single transmission (hydraulic or otherwise) to drive both right and left drive wheels 112. Two front caster wheels 114*a*, 114*b* allow the mower to be easily maneuvered in a zero turn radius fashion. In the example illustrated in which the illustrated machine comprises a lawnmower, a mower deck 113 is hung from chassis 104, wherein the mower deck supports one or more mowing blades 115 powered by prime mover 102.

Figure 2:
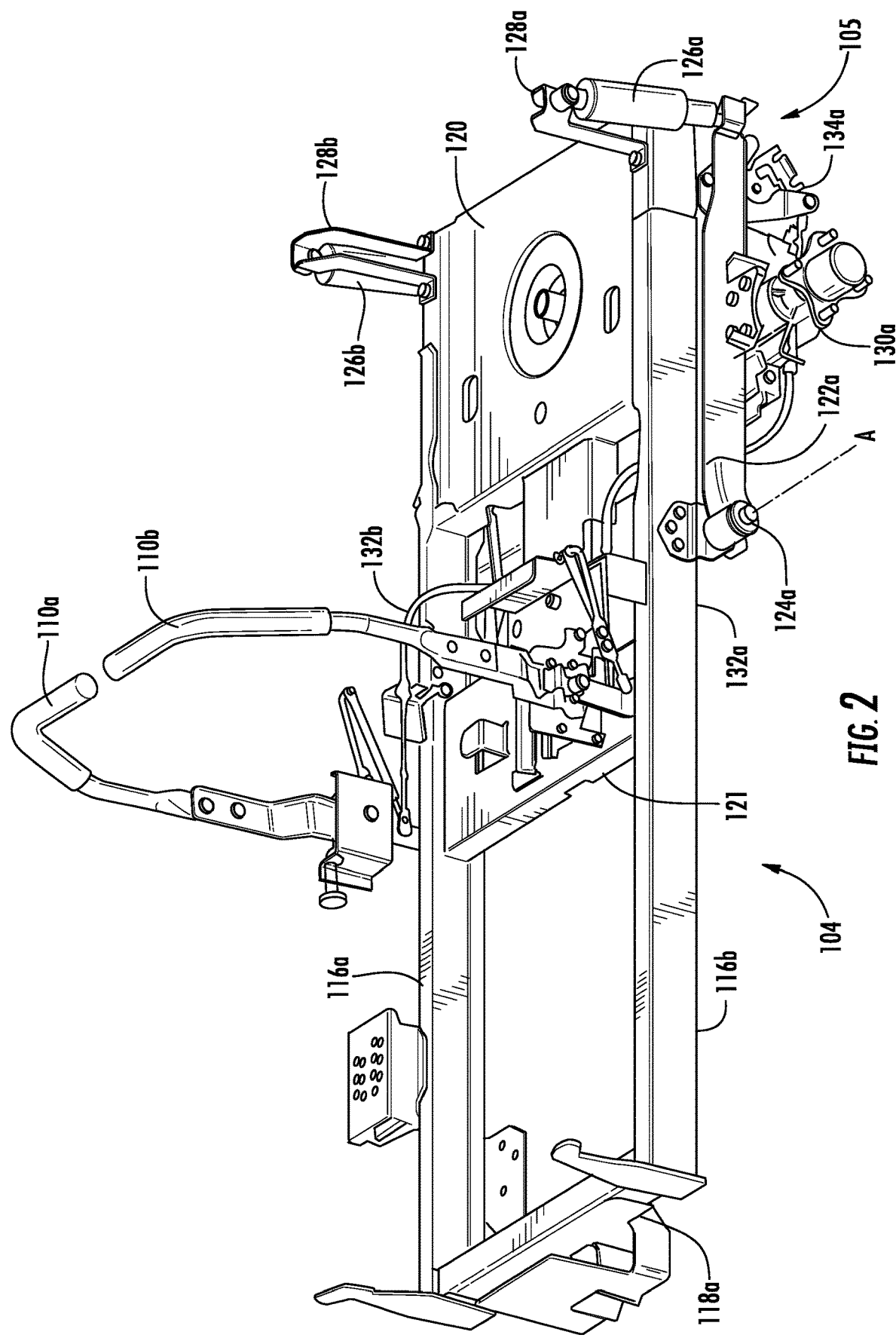
FIG. 2 is a perspective view of select machine and suspension components.
Figure 3:
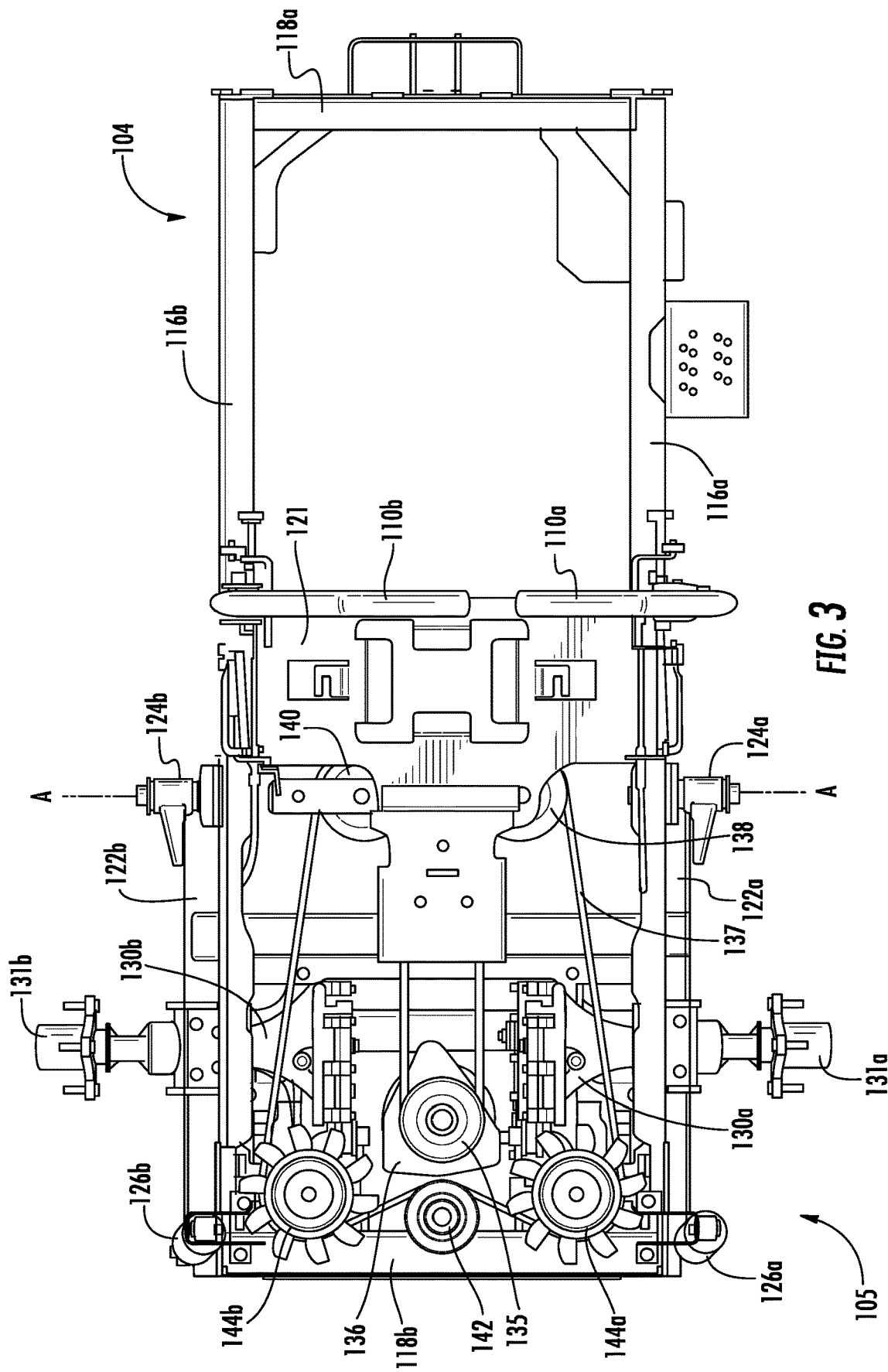
FIG. 3 is a top view of select machine and suspension components.

FIGS. 2-3 are partial views of various components of ZTR mower 100. As shown by FIGS. 2 and 3, chassis 104 comprises two longitudinal support beams 116*a*, 116*b*, a front cross beam 118*a*, and a central plate 121 coupled to respective longitudinal support beams 116*a*, 116*b*. Chassis 104 also comprises a prime mover mounting plate 120 upon which prime mover 102 is coupled. Additionally, a suspended subframe 105 is pivotally mounted to chassis 104 about a pivot axis A at respective pivot points 124*a*, 124*b*. Suspended platform 105 supports thereon integrated hydrostatic transaxles 130*a*, 130*b*, which integrally contain both a hydraulic pump and a hydraulic motor therein for driving drive wheels 112. Control cables 132*a*, 132*b* for each control lever 110*a*, 110*b* are coupled to bell cranks 134*a*, 134*b* on respective hydrostatic transaxles 130*a*, 130*b*, which enables forward and reverse control of transaxles 130*a*, 130*b* in a manner known in the art. While cables 132*a*, 132*b* are shown, it is also possible for the connection between control levers 110*a*, 110*b* and hydrostatic transaxles 130*a*, 130*b* to be via other types of suitable linkages.

Suspended subframe 105 comprises longitudinal support beams 122*a*, 122*b*, wherein the distal ends of longitudinal support beams 122*a*, 122*b* are coupled to respective suspension devices 126*a*, 126*b*. Suspension devices 126*a*, 126*b* could be any suitable suspension mechanism such as a coil-over-shock device, a dampener, etc. Suspension devices 126*a*, 126*b* are also coupled to respective supports 128*a*, 128*b* mounted on longitudinal support beams 116*a*, 116*b* of chassis 104. With this configuration, subframe 105 is pivotally suspended from chassis 104 about pivot axis A such that drive wheels 112 are capable of substantially vertical translation as ZTR mower 100 moves over rough terrain, etc. FIG. 2 shows subframe 105 in a substantially compressed position, but it is to be understood that subframe 105 may typically be at angled at various positions with respect to chassis 104 originating at pivot points 124*a*, 124*b*, generally dependent upon the presence of an operator, condition of the terrain, etc. As hydrostatic transaxles 130*a*, 130*b* are coupled to subframe 105, they too are capable of vertical translation about pivot axis A. Conversely, because prime mover 102 is affixed to mounting plate 120 on chassis 104, prime mover 102 does not move in concert with suspended subframe 105.

FIG. 3 is a top view of various example ZTR mower components. As discussed above with respect to FIG. 2, suspended subframe 105 pivots about a pivot axis A from chassis 104. Respective longitudinal support beams 122*a*, 122*b* of subframe 105 act to at least partially support hydrostatic transaxles 130*a*, 130*b* (collectively referred to as transaxles 130), which are coupled to drive wheels through respective wheel hubs 131*a*, 131*b*. In order to transfer power from a prime mover (not shown) to the respective hydrostatic transaxles 130*a*, 130*b*, an engine drive pulley 135 is coupled to a power take-off (PTO) shaft of the prime mover and connected via a belt 137 using a pulley arrangement to be discussed in further detail below. A PTO clutch 136 is also coupled to the PTO shaft of the prime mover to drive the blades 108 of a mower deck 104 coupled to chassis 104 via a separate belt (also not shown). Belt 137 could be any suitable drive belt, but is preferably a double-A or double-V-type belt to allow the belt to drive pulleys on both its inside and outside surfaces.

Figure 4:
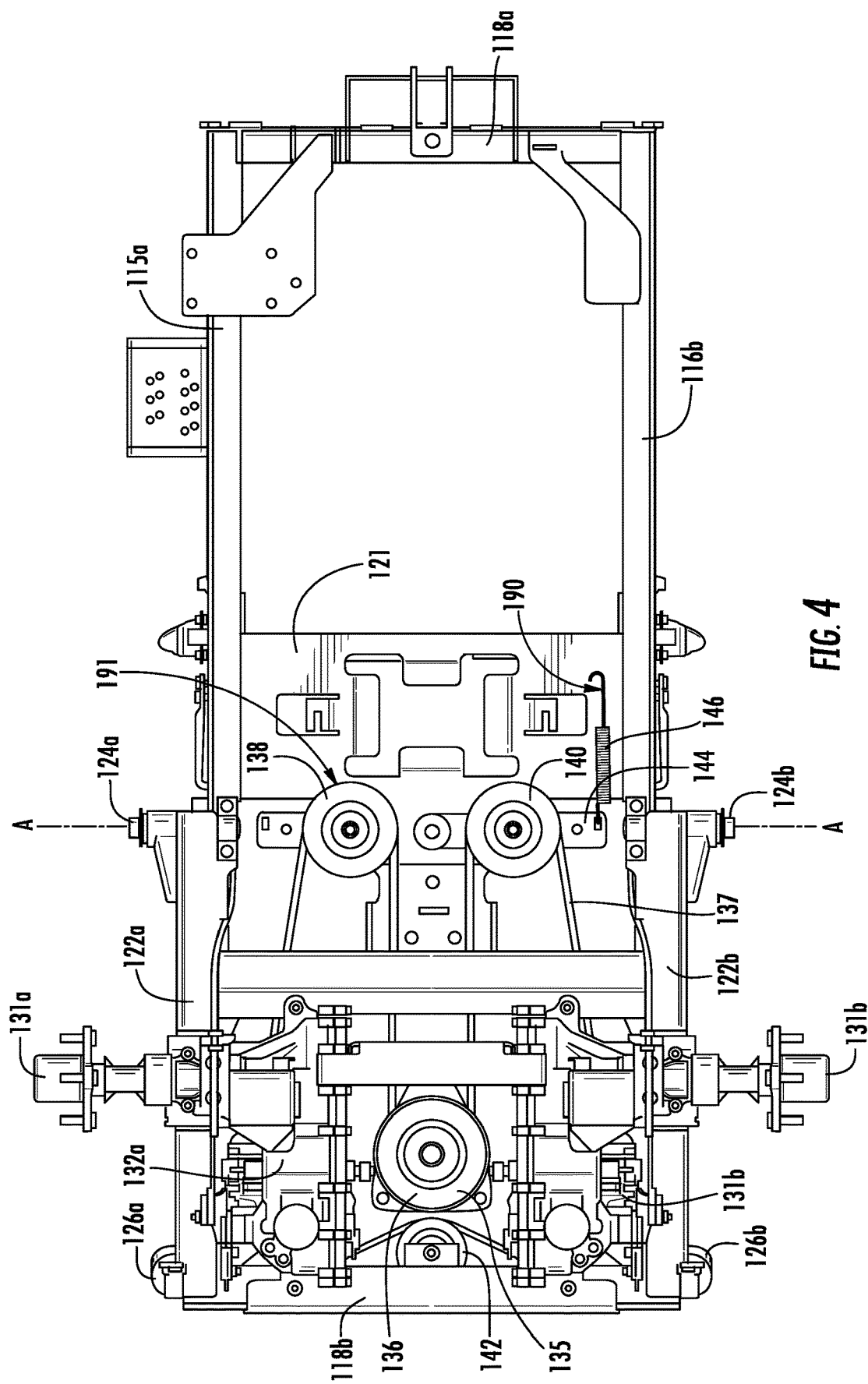
FIG. 4 is a top perspective view of a portion of the example machine and suspension of FIG. 1.
Figure 5:
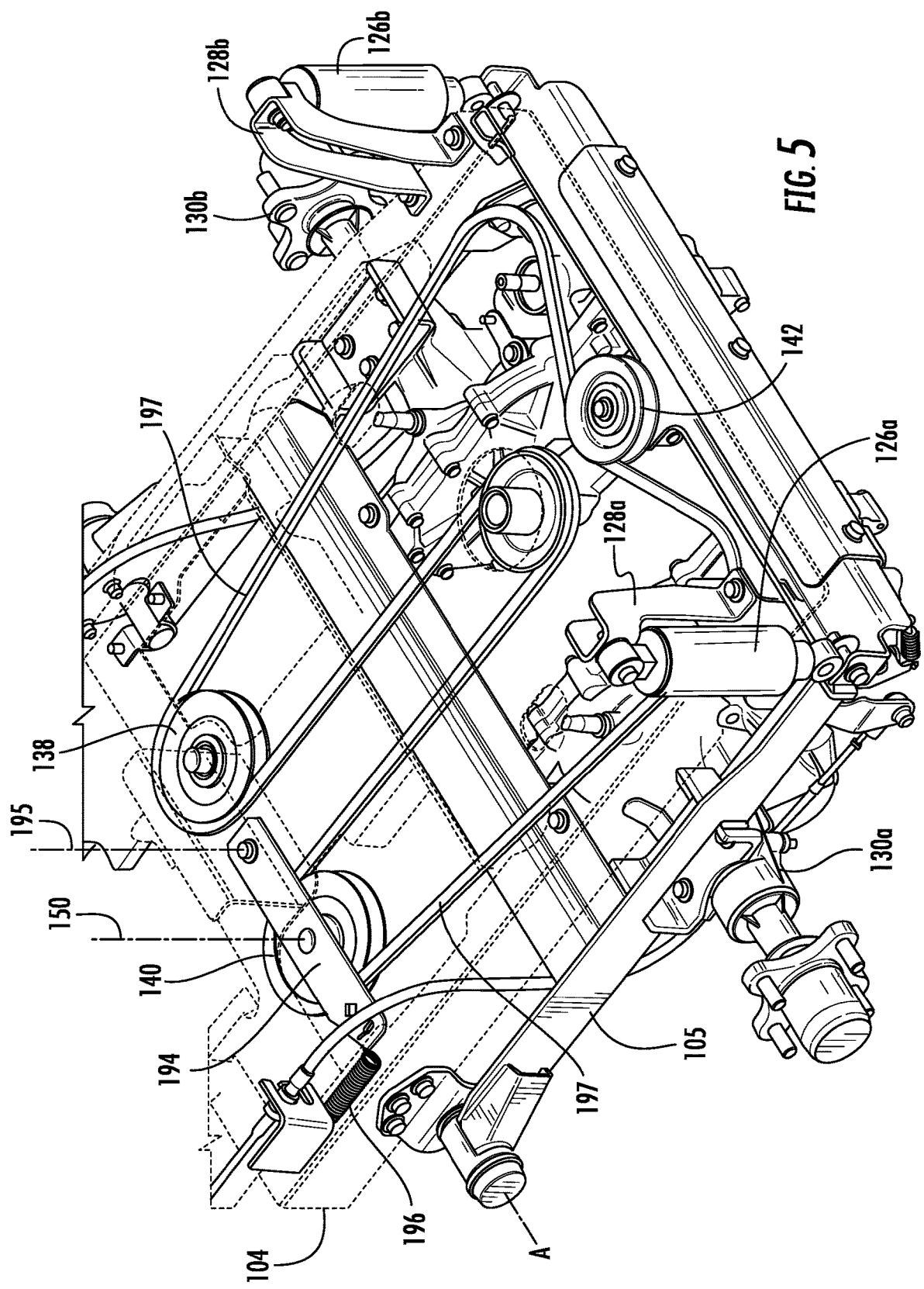
FIG. 5 is a rear perspective view of a portion of the example machine and suspension of FIG. 1

FIGS. 4 and 5 illustrate an example pulley arrangement 141 that guides and directs belt 137 so as to drive each of hydrostatic transaxles 130. Pulley arrangement comprises idler pulleys 138, 140, 142 and drive pulleys 144*a*, 144*b*. Belt 137 runs from PTO clutch 136 to idler pulleys 138, 140, wherein idler pulleys 138, 140 are mounted on central plate 121 of chassis 104. Accordingly, idler pulleys 138, 140 do not pivot about pivot axis A or otherwise move with vertical translation of suspended subframe 105. From idler pulleys 138, 140, belt 137 runs to drive pulleys 144*a*, 144*b* on respective hydrostatic transaxles 130*a*, 130*b* in order to enable hydraulic drive of the transaxles 130*a*, 130*b*. Idler pulley 142 is coupled to a rear cross beam 118*b* of subframe 105 to maintain tension and provide sufficient belt-wrap of belt 137 around drive pulleys 144*a*, 144*b*.

As mentioned above, idler pulleys 138, 140 are mounted on central plate 121 of chassis 104, while drive pulleys 144*a*, 144*b* are coupled to hydrostatic transaxles 130*a*, 130*b*, meaning drive pulleys 144*a*, 144*b* also move in concert with any translation of suspended subframe 105. As idler pulleys 138, 140 are stationary (i.e., do not pivot with respect to pivot axis A) and drive pulleys 144*a*, 144*b* move with suspended subframe 105, the angle of belt 137 between these sets of pulleys changes with the various the suspension conditions of subframe 105. Accordingly, proper placement of idler pulleys 138, 140 is important to avoid significant changes in belt angle during operation of the mower, as such significant changes may cause belt 137 to "jump" during operation and disengage belt 137 from the drive system.

Figure 6:
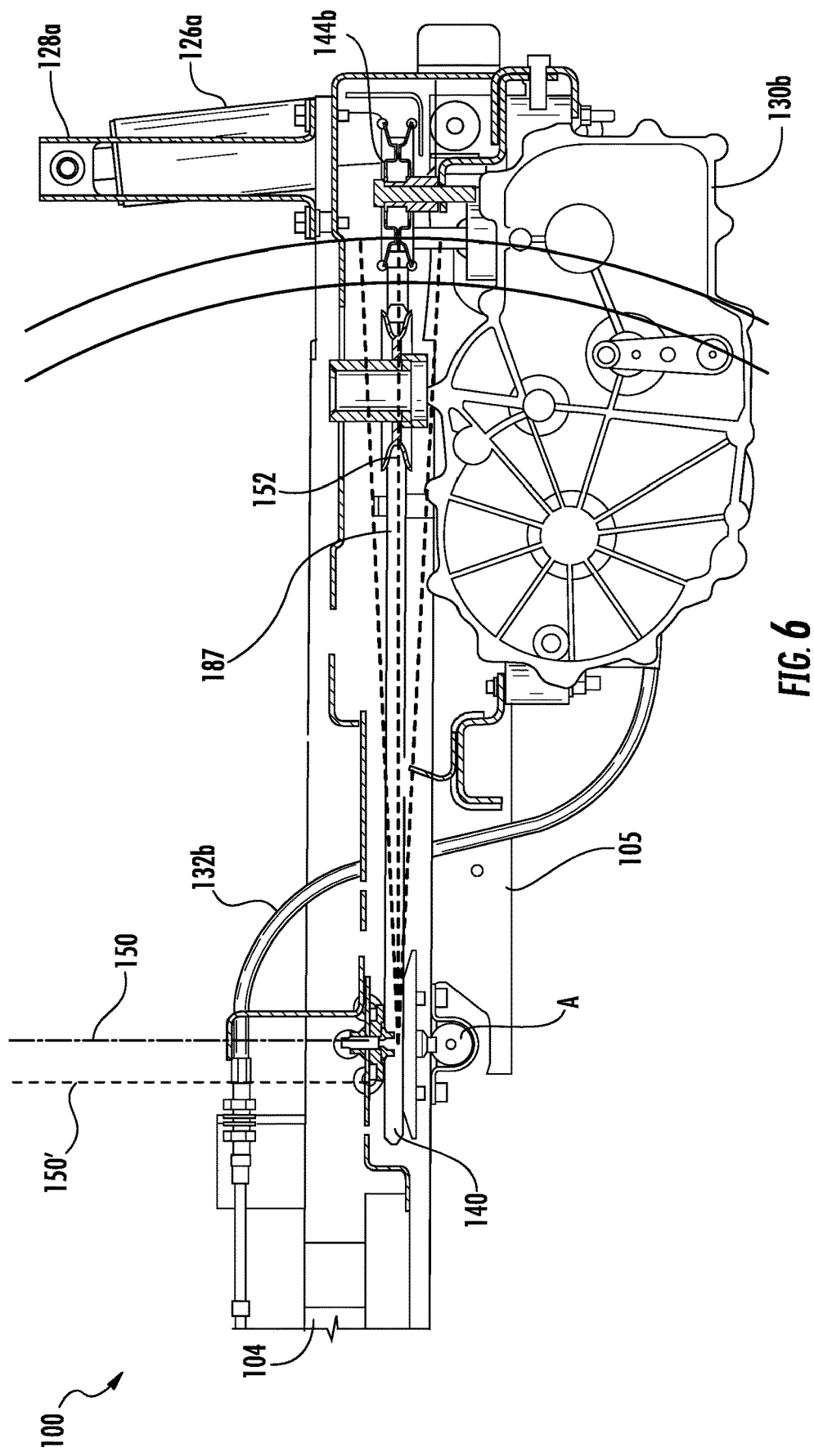
FIG. 6 is a sectional view of a portion of an example machine and suspension of FIG. 1.
Figure 7:
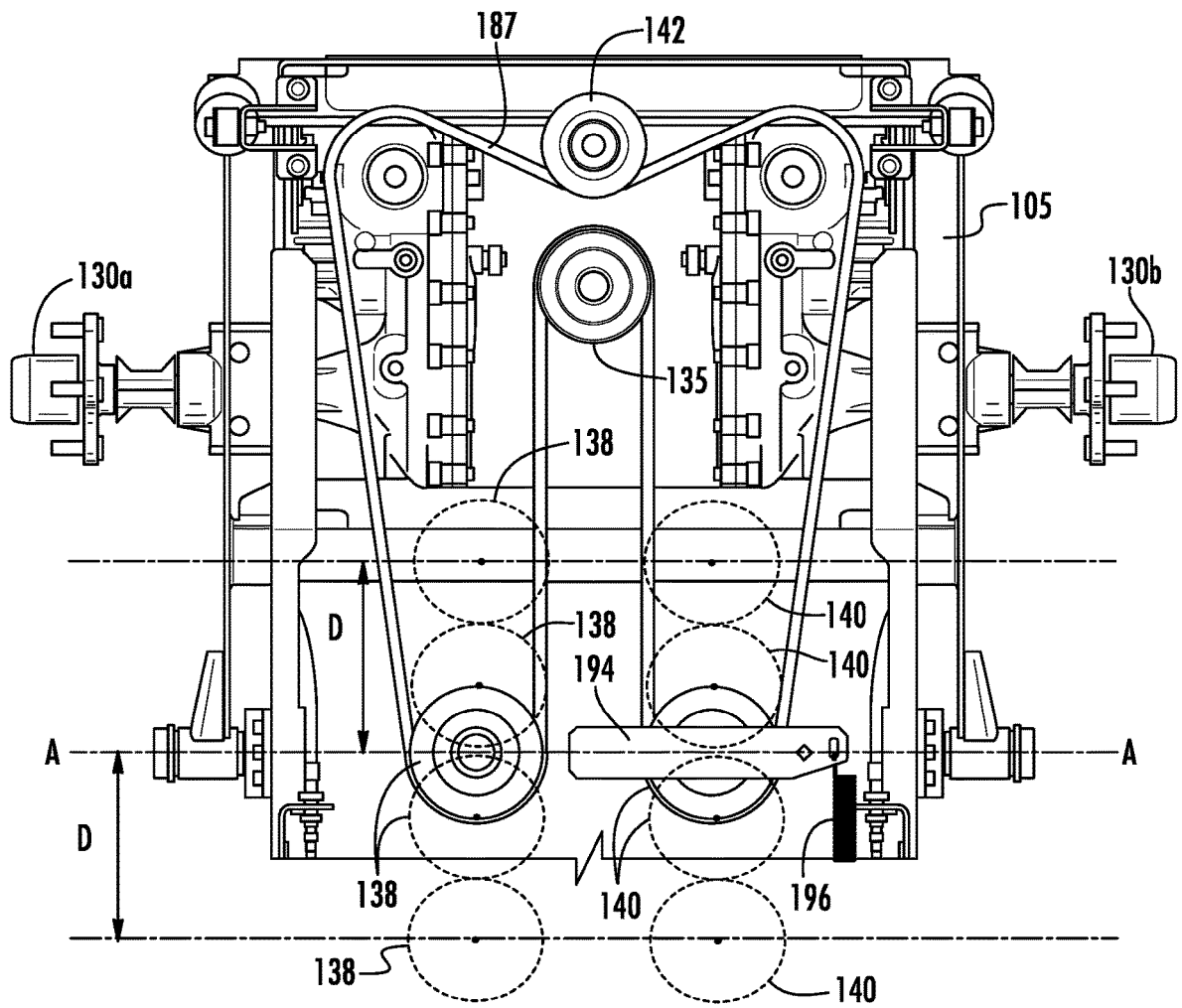
FIG. 7 is a bottom view of a portion of the example machine and suspension of FIG. 1 illustrating various alternative idler pulley positions.
Figure 8:
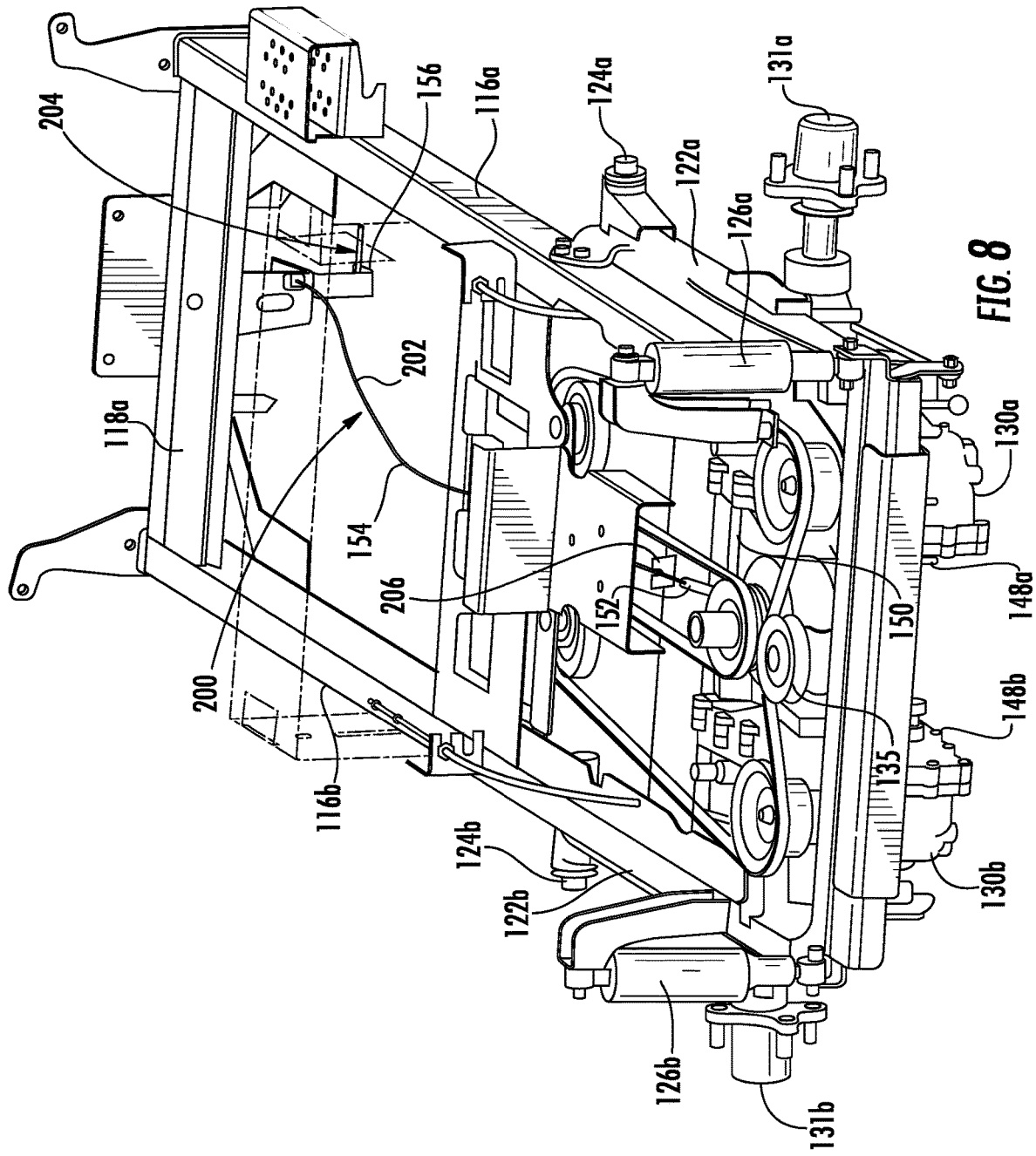
FIG. 8 is a top front perspective view illustrating an example parking brake system of the example machine of 1.
Figure 9:
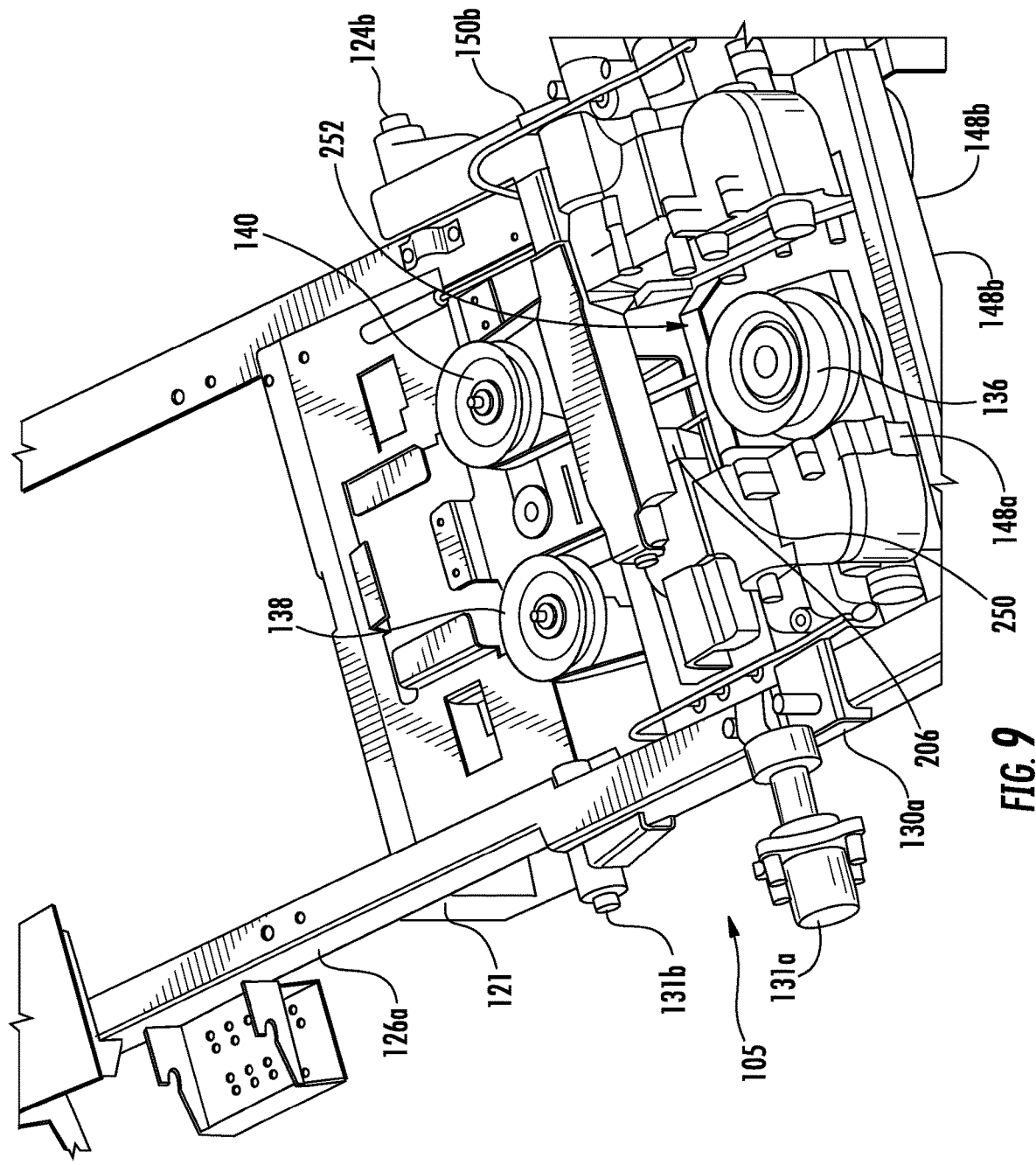
FIG. 9 is a top rear perspective view illustrating the example parking brake system.
Figure 10:
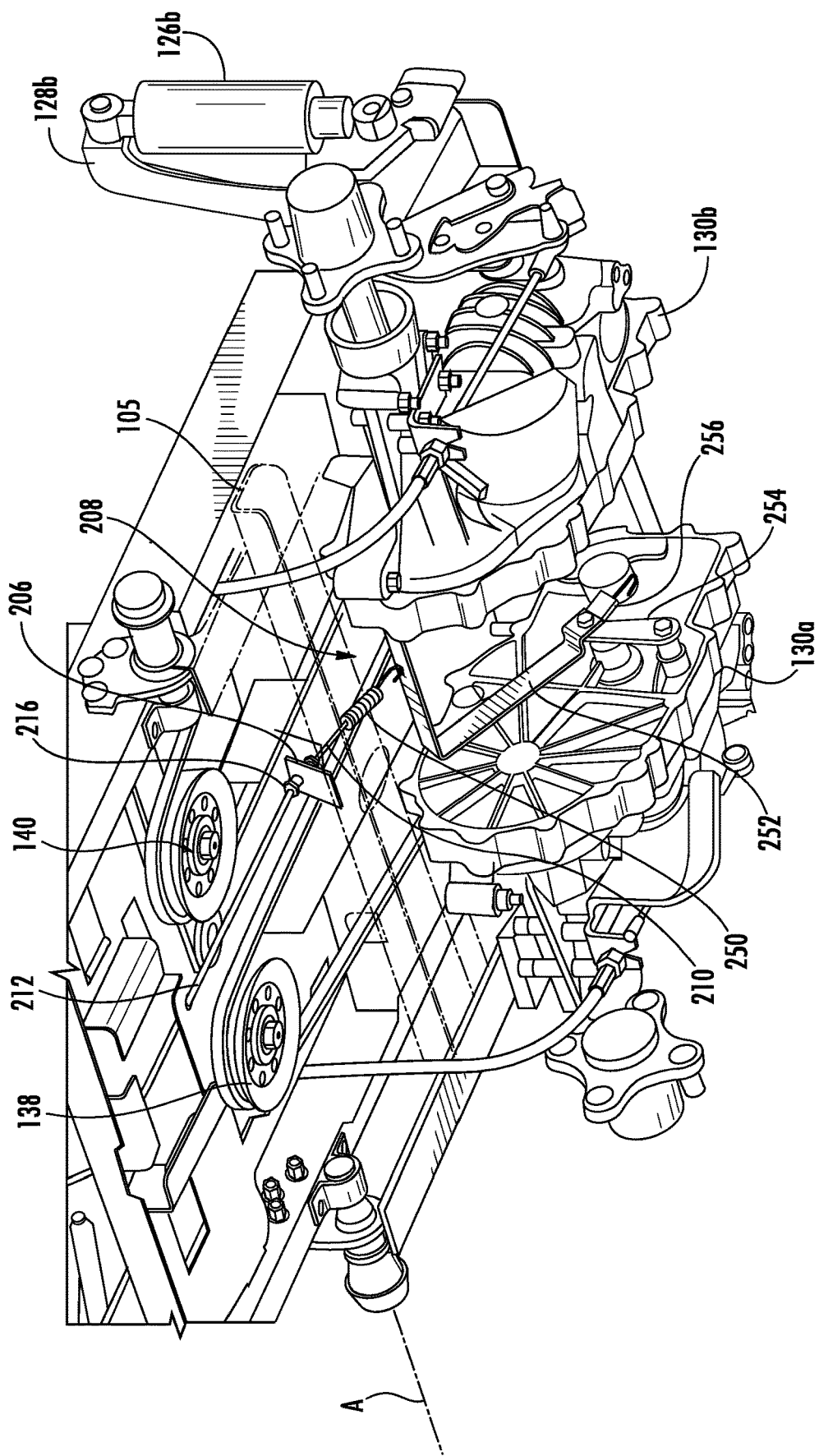
FIG. 10 is a bottom perspective view illustrating the example parking brake system.

FIGS. 6 and 7 illustrate examples for the placement of idler pulleys 130, 140. As shown by FIG. 6, in one implementation, the rotational axes 150 of idler pulleys 138, 140 are perpendicular to and substantially in line with pivot axis A of suspended subframe 105. For the purposes of this embodiment, idler pulleys 138, 140 being "substantially" in line with the pivot axis A may mean that the pulleys are directly in line with pivot axis A (with no perceivable offset, intersecting pivot axis A), within one pulley diameter forward of pivot axis A, or a greater distance forward of pivot axis A within the confines of chassis 104.

In the example illustrated in FIG. 6, axes 150 of idler pulleys 138, 140 are directly in line with pivot axis A, intersecting pivot axis A. As a result, as indicated by radius lines 152, the belt angle between idler pulleys 138, 140 and drive pulleys 144*a*, 144*b* is as small as possible, regardless of the suspension condition of subframe 105. In other words, the length of belt 137 insubstantially changes or does not change in response to the pivoting of subframe 105. Because the length of belt 137 does not change despite the pivoting of subframe 105, the risk of belt 105 jumping and becoming disengaged from any of the pulleys of the pulley arrangement 141 is reduced.

FIG. 7 is a top view of portions of mower 100 illustrating alternative positions for idler pulleys 138, 140. In other implementations, the rotational axes 150 of idler pulleys 138, 140 may be spaced, forwardly or rearwardly, from pivot axis A by a distance D of up to 1.5 times the diameter of at least one of idler pulleys 138, 140. In such implementations, the length of belt may more substantially change as subframe 105 pivots, possibly requiring more robust and complex belt take up assemblies.

In some implementations, idler pulleys 138, 140 may alternatively be set slightly closer to the front of the mower (i.e., in the direction of control levers 110*a*, 110*b*. For example, in one implementation, idler pulleys 138, 140 may have rotational axes 150' which are located less than or equal to 1 inch of pivot axis A as shown in FIG. 6. In other implementations, idler pulleys 138, 140 may be positioned a distance of one pulley diameter forward of pivot axis A without substantial changing the complexity of the system. As illustrating FIG. 7, in some implementations, idler pulleys 138, 140 may be positioned even further forward of pivot axis A (by greater than one pulley diameter) depending on the overall layout of the mower and intervening components, but this again may add to the complexity of the belt take-up assembly.

FIGS. 4 and 5 illustrate one example belt take-up assembly 190 for taking up slack in belt 187 that may result from the pivoting of subframe 105 about pivot axis A. Belt take-up assembly 190 helps maintains belt tension on the system (i.e., "take-up"). In the example illustrated, belt take up assembly 190 comprises a movable support that movably supports the rotational axis of at least one of idler pulleys 138, 140 for movement between different positions to relocate the rotational axis and a bias mechanism resiliently biasing the idler pulley towards a predefined position for the rotational axis. In the example illustrated, the movable support comprises an idler arm 194 having a first end portion pivotally coupled to chassis 104 for pivotal movement about axis 195, a central portion rotatably supporting the idler pulley, idler pulley 140 for rotation about axis 150 and a second end portion resiliently biased towards a preset a predefined position. In the example illustrated, the bias mechanism comprises a tension spring 196 interconnecting the second end portion of arm 194 and chassis 104. During pivoting of subframe 105, spring 196 stretches or constricts as the rotational axis pulley 140 changes to accommodate the change in the length of segments or strands 197 of belt 187, extending between the idler pulleys 138, 140 and the drive pulleys 144*a* and 144*b*. In other implementations, belt take up assembly 190 may have other configurations.

Figure 11:
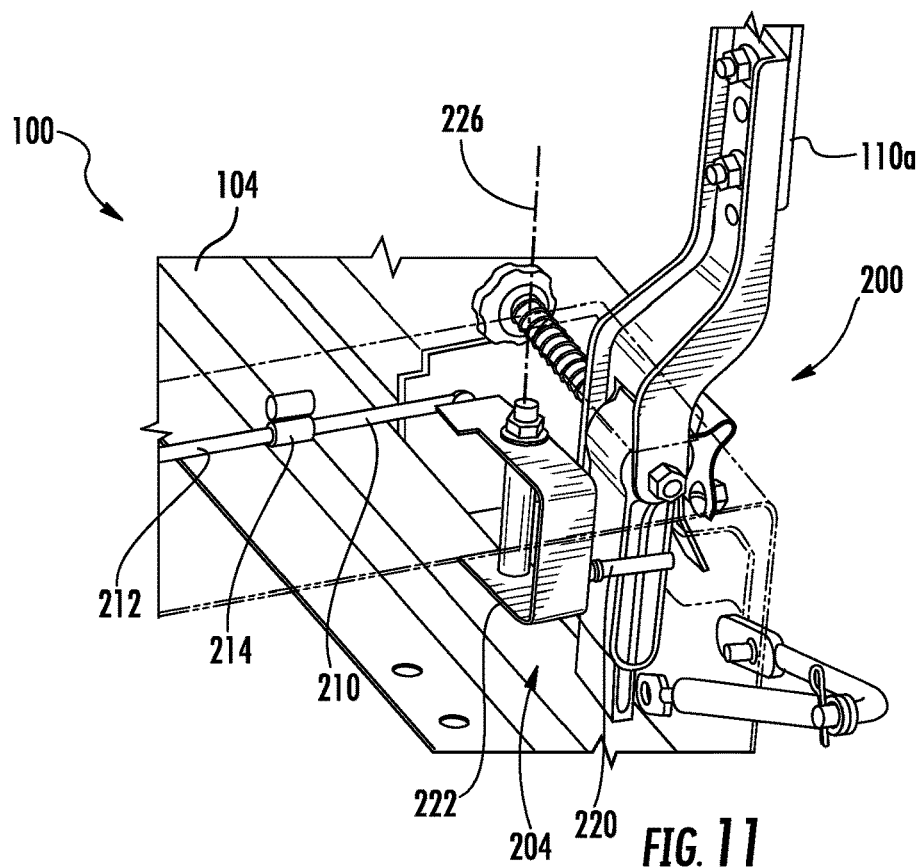
FIG. 11 is a fragmentary perspective view of a portion of the parking brake system in a brake disengaged position.

FIGS. 8-13 illustrate an example parking brake system 200 for mower 100. Parking brake system 200 is configured to brake wheels 112 when the mower 100 is in a parked or stopped position. Parking brake system 200 comprises flexible cable 202, control arm interface 204, cable mount 206 and brake interface 208. Flexible cable 202 extends between control arm 110*a* (shown in FIGS. 1-3) and each of hydrostatic transaxles 130 so as to transmit motion of control arm 110*a* to an internally located braking mechanism within each of hydrostatic transaxles 130. In the example illustrated, flexible cable 202 comprises a Bowden cable, a cable comprising an inner flexible cable 210 and an outer guiding sheath 212 (shown in FIG. 12). The inner flexible cable 210 is connected to the control arm interface 204 and the brake interface 208 at opposite ends, wherein the inner flexible cable is pushed and pulled through, along and relative to the outer flexible sheath 212. The outer flexible sheath 212 has a first end 214 (as shown in FIG. 11) fixedly coupled to chassis 104 proximate to control arm interface 204 and a second end 216 fixedly coupled to cable mount 206 supported by subframe 105. The outer flexible sheath 212 has sufficient slack between its ends such that the outer flexible sheath may accommodate movement of cable mount 206 resulting from pivotal movement of suspension 105

FIG. 11 illustrates control arm interface 204 in more detail. Control arm interface 204 comprises rod 220 and bell crank bracket 222. Rod 220 is coupled between control arm 110*a* and bell crank bracket 222. In one implementation, rod 220 is affixed at one end to control arm 110*a* and a second end to bell crank bracket 222.

Figure 12:
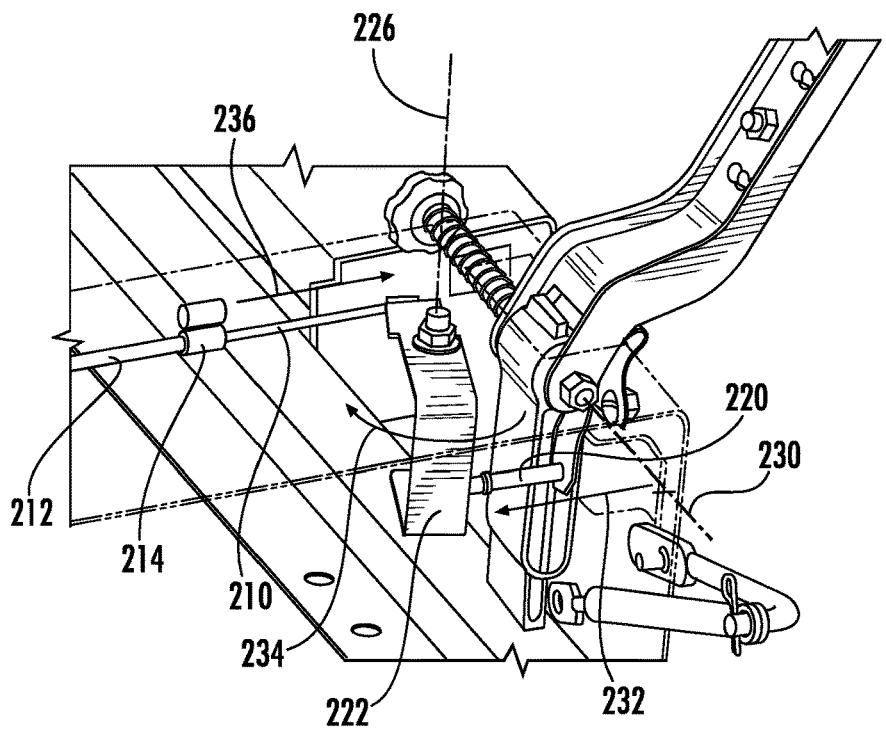
FIG. 12 is a fragmentary perspective view of the portion of the parking brake system in a brake engaged position.
Figure 13:
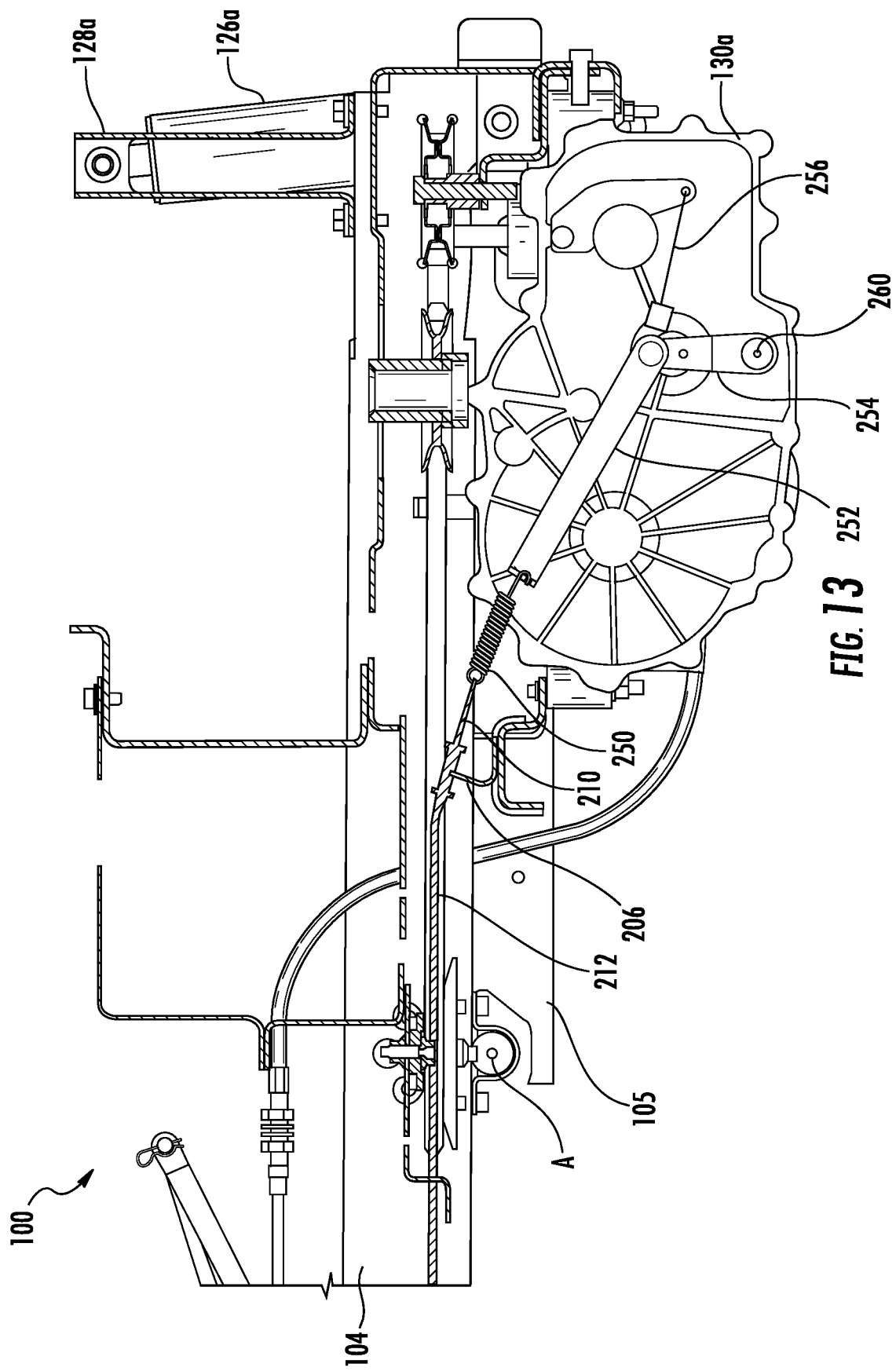
FIG. 13 is a sectional view of the example machine illustrating parking brake system components.

Bell crank bracket 222 comprises a bracket pivotably coupled to chassis 104 for rotation about axis 226. Bracket 222 is connected to rod 220 on a first side of axis 226 and is connected to flexible cable 210 on a second side of axis 226. As shown by FIG. 12, pivoting of control arm 110*a* outwards, about axis 230 drives rod 220 in the direction indicated by arrow 232 which results in bell crank bracket 222 being rotated in the direction indicated by arrow 234. Rotation of bell crank bracket 222 and the direction indicated by arrow 232 results in table 210 being pulled through and relative to sheath 212 in the direction indicated by arrow 236. Such motion is transmitted through an along sheath 212 to brake interface 208.

Cable mount 206 comprises a structure affixed to and carried by subframe 105 so as to pivot with subframe 105. Cable mount 206 secures end 216 of sheath 212 to subframe 105. Cable mount 206 ensures that the sheath about flexible cable 210 also moves with the pivoting of subframe 105, wherein the actual length of the flexible cable 210 within sheath 212 does not change.

Brake interface 208 comprises one or more structures interconnecting flexible cable 216. Brake interface 208 comprises spring 250, bracket 252, lever 254 and bias 256. Spring 250 comprises a tension spring connected between cable 210 and bracket 252. Spring 250 exerts a bias through flexible cable 210 to bell crank bracket 222, opposing outward pivoting of control arm 110*a*. Spring 250 further transmits motion of cable 210 to bracket 252.

Bracket 252 comprises a non-flexible frame or member that interconnects spring 250 and lever 254. Bracket 252 further interconnects spring 250 to a second lever 254 associated with the other hydrostatic transaxle 131*b*. In the example illustrated, bracket 252 comprises an inflexible or rigid U-shaped frame having opposing spaced legs extending on opposite sides of PTO clutch 136 and connected to each of the levers 254 of the two hydrostatic transaxles 131. In other implementations, bracket 252 may have other configurations.

Lever 254 comprises a rigid brake engaging member pivotally connected to bracket 252 at one end and connected to a shaft or rod that rotates about axis 260 and that extends into the respective transaxle 130*a*, 130*b* to an internal cog or other component (not shown) within transaxles 130*a*, 130*b* when in the "park" position to prevent rotation of the drive wheels. Spring 256 comprise a tension spring having one end connected to or affixed relative to an outer housing of the respective transaxle 130 and having another end connected to lever 254 to bias lever 254 to a predefined position, such as a position in which the internal brake of the transaxle 130 is disengaged. In other implementations, other mechanisms may be utilized to bias lever 254 to a predefined position.

Due to the suspended nature of subframe 105, it is important that U-shaped frame 150 remain stationary relative to transaxles 130*a*, 130*b* unless actuated by the user to apply the parking brake. Accordingly, while flexible cable 210 may move with corresponding pivotal movement of subframe 105, spring 152 and U-shaped frame 150 are mounted only to components of subframe 105 such that translation of the suspension system alone does not move levers 254 and inadvertently actuate the cogs or other components within transaxles 130*a*, 130*b* to actuate the brake while the mower is moving.

Figure 14:
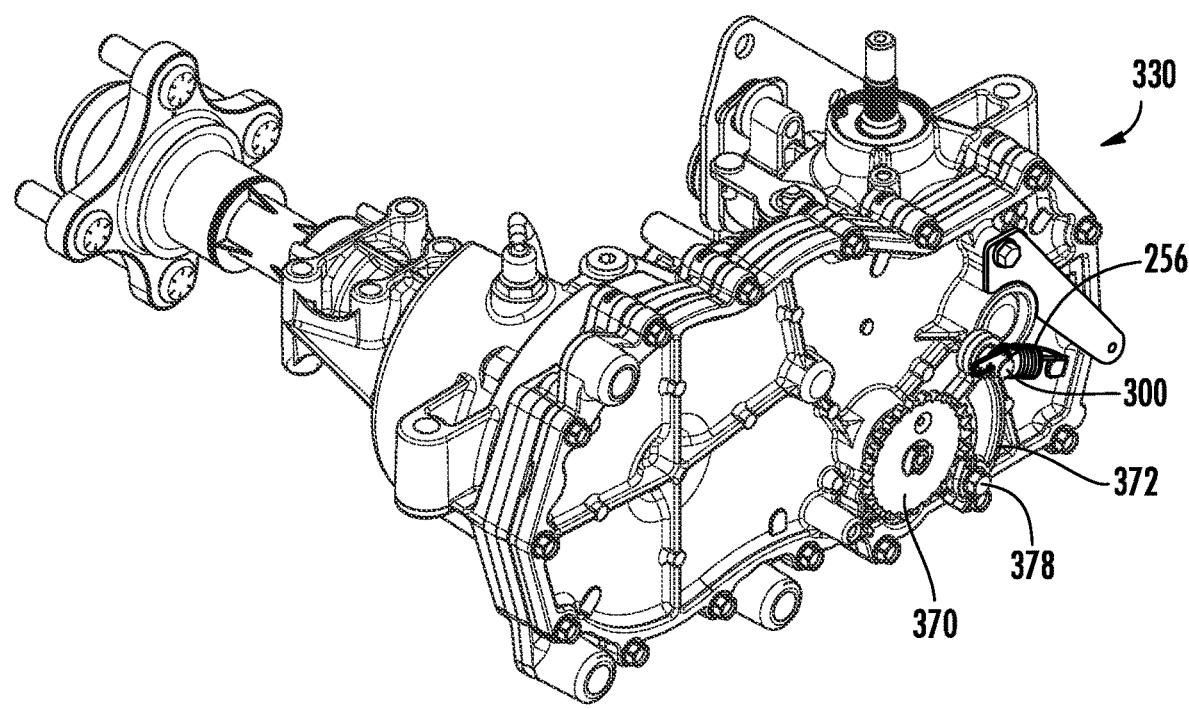
FIG. 14 is a perspective view of another example hydrostatic transaxle and associated portions of another example parking brake system.

FIG. 14 illustrates hydrostatic transaxle 330, an alternative implementation of hydrostatic transaxle 130*a* or 130*b*.

Transaxle 330 is similar to transaxle 130 except that transaxle 330 has an external braking mechanism comprising gear 370 and brake 372. Gear 370 is affixed to a shaft and operably coupled to the output shaft of transaxle 330 and wheel 112. Brake 372 comprises a curved toothed brake engagement member pivotable about axis 378 between a gear engaging, braking position and a withdrawn, brake disengaged position. In such an implementation, bracket 252 (shown in FIG. 13) is pivotally connected to brake 372 at connection 380. In one of limitation, bracket 252 is pivotally connected to brake 372 at connection 380 for each of the two transaxles 330. Similar to lever 254, brake 372 is resiliently biased towards a withdrawn position by spring 256.

In operation, in response to lever arm 110a being pivoted outward about axis 230 as shown in FIG. 12, flexible cable 210 is pulled to pull up on spring 250. Spring 250 pulls upon bracket 250 which pivots brake 372, against the bias of spring 256, into braking engagement with gear 370. Pivoting of control arm 110a to the inner position shown in FIG. 11 results in bracket 252 pivoting brake 372 about axis 378 away from and out of engagement with brake 370. Such withdrawal to the brake disengaged position is further assisted by the bias of spring 256.

Although the present disclosure has been described with reference to example implementations, workers skilled in the art will recognize that changes may be made in form and detail without departing from the spirit and scope of the claimed subject matter. For example, although the pulley arrangement and the parking brake system are illustrated as being utilized as part of a riding lawnmower such as a zero turn radius mower, in other implementations, we discussed pulley arrangement and parking brake system may be employed and other machines or other pieces of lawn and garden equipment which employ a suspension that carries drive devices that are driven by a prime mover. Although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompasses a plurality of such particular elements.

What is claimed is:

1. A machine comprising:
   a prime mover
   an engine drive pulley coupled to the prime mover;
   a chassis, wherein the chassis is configured to support at least an operator and the prime mover;
   a subframe pivotally coupled to the chassis about a pivot axis, wherein the subframe is further coupled to the chassis via at least one suspension device;
   at least one drive device configured to drive wheels of the machine, the at least one drive device driven by the prime mover;
   a drive belt; and
   a pulley arrangement configured to direct the drive belt from the engine drive pulley of the prime mover to at least one drive pulley on the at least one drive device, wherein the pulley arrangement comprises at least one idler pulley having a diameter and a rotational axis.

2. The machine of claim 1, wherein the machine comprises a lawn mower.

3. The machine of claim 1, wherein the at least one idler pulley comprises a first idler pulley having a first diameter and a first rotational axis and a second idler pulley having a second diameter and a second rotational axis.

4. The machine of claim 1, wherein the at least one drive device comprises at least one hydrostatic transaxle having at least one output shaft located along a transaxle axis and coupled to a drive wheel of the machine and wherein the at least one drive pulley is located rearward of the transaxle axis and the at least one idler pulley is positioned forward of the transaxle axis.

5. The machine of claim 4, wherein the engine drive pulley is located rearward of the transaxle axis.

6. The machine of claim 1, wherein the subframe comprises a first longitudinal support beam, a second longitudinal support beam, and a cross beam.

7. The machine of claim 1, wherein the prime mover is at least one of an internal combustion engine and an electric motor.

8. The machine of claim 1, wherein the prime mover is coupled to a plate on the chassis.

9. The machine of claim 1, wherein the idler pulley is movable to reposition the rotational axis and wherein the machine further comprises a bias mechanism resiliently biasing the idler pulley towards a predefined position for the rotational axis.

10. The machine of claim 9, wherein the bias mechanism comprises an idler arm rotationally supporting the idler pulley and tensioning spring coupling the idler arm to the chassis.

11. The machine of claim 1, wherein the rotational axis of the idler pulley is offset from the pivot axis.

12. A machine comprising:
    a prime mover, the prime mover having a power takeoff;
    a chassis, wherein the chassis is configured to support at least an operator and the prime mover;
    a subframe pivotally coupled to the chassis about a pivot axis, wherein the subframe is further coupled to the chassis via at least one suspension device;
    at least hydrostatic transaxle having at least one output shaft having a transaxle axis, the output shaft coupled to a drive wheel of the machine, the at least one hydrostatic transaxle driven by the prime mover and coupled to the subframe;
    a drive belt; and
    a pulley arrangement configured to direct the drive belt from the power take-off of the prime mover to at least one drive pulley on the at least one hydrostatic transaxle, wherein the pulley arrangement comprises at least one idler pulley having a diameter and a rotational axis, and wherein the at least one drive pulley is located rearward of the transaxle axis.

13. The machine of claim 12 further comprising a mower deck coupled to the chassis and rotationally supporting a mower blade.

14. The machine of claim 12, wherein the rotational axis of the idler pulley is spaced near the pivot axis.

15. The machine of claim 12, further including an engine drive pulley coupled to the power takeoff and wherein the engine drive pulley is located rearward of the transaxle axis.

16. The machine of claim 15, wherein pulley arrangement is configured to direct the drive belt from the engine drive pulley to the at least one drive pulley on the at least one hydrostatic transaxle.

17. The machine of claim 12 further comprising:
a parking brake system comprising:
at least one brake engagement member actuatable to engage a parking brake on the at least one drive device;
a cable mount carried by the subframe;
a flexible cable having a sheath, wherein the sheath is coupled to the cable mount and the flexible cable is further coupled to the brake engagement member to actuate the brake engagement member to engage the parking brake on the at least one drive device,
wherein the cable mount is carried on the subframe so as to not enable the flexible cable to actuate the brake engagement member through pivotal movement of the subframe alone.

18. The machine of claim 17 further comprising a control member operably coupled to the flexible cable to move the flexible cable relative to the sheath to actuate the brake engagement member to engage the parking brake on the at least one drive.

19. The machine of claim 18 further comprising a spring operably coupled between the flexible cable and the brake engagement member.

\* \* \* \* \*